United States Patent
Okazaki

(10) Patent No.: US 8,398,797 B2
(45) Date of Patent: Mar. 19, 2013

(54) PRODUCTION METHOD OF CORDIERITE-BASED CERAMIC HONEYCOMB FILTER

(75) Inventor: Shunji Okazaki, Fukuoka-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/376,526

(22) PCT Filed: Sep. 28, 2007

(86) PCT No.: PCT/JP2007/069106
§ 371 (c)(1), (2), (4) Date: Mar. 17, 2009

(87) PCT Pub. No.: WO2008/044508
PCT Pub. Date: Apr. 17, 2008

(65) Prior Publication Data
US 2010/0006207 A1   Jan. 14, 2010

(30) Foreign Application Priority Data
Sep. 29, 2006   (JP) .................................. 2006-268616

(51) Int. Cl.
C04B 33/34 (2006.01)
B28B 1/00 (2006.01)
(52) U.S. Cl. ..................... 156/89.22; 264/603; 264/630; 264/628; 264/631
(58) Field of Classification Search ................. 156/89.12
See application file for complete search history.

(56) References Cited

U.S. PATENT DOCUMENTS

| 4,280,845 A | 7/1981 | Matsuhisa et al. |
| 4,293,357 A | 10/1981 | Higuchi et al. |
| 4,297,140 A * | 10/1981 | Paisley ........................ 428/312.6 |
| 4,329,162 A * | 5/1982 | Pitcher, Jr. ....................... 55/523 |
| 4,557,773 A * | 12/1985 | Bonzo ............................... 156/64 |
| 5,262,102 A * | 11/1993 | Wada ............................. 264/631 |
| 6,048,490 A * | 4/2000 | Cornelius et al. ............. 264/631 |
| 2003/0143370 A1 | 7/2003 | Noguchi et al. |
| 2005/0025933 A1* | 2/2005 | Masukawa et al. ........... 428/116 |
| 2005/0046063 A1* | 3/2005 | Toda et al. ....................... 264/44 |
| 2005/0242455 A1* | 11/2005 | Toda et al. ....................... 264/44 |
| 2006/0159602 A1* | 7/2006 | Ohno et al. ................... 422/211 |

(Continued)

FOREIGN PATENT DOCUMENTS

DE   102007000529 A1   6/2008
EP     0073634 A1   3/1983
(Continued)

OTHER PUBLICATIONS

European Search Report issued Sep. 20, 2011 for counterpart application PCT/JP2007069106.

*Primary Examiner* — Philip Tucker
*Assistant Examiner* — Alex Efta
(74) *Attorney, Agent, or Firm* — Sughrue Mion, PLLC

(57) ABSTRACT

A method for producing a cordierite-based ceramic honeycomb filter comprising the steps of introducing a plugging material of a cordierite-forming material into predetermined flow paths of a sintered, cordierite-based ceramic honeycomb having an outer diameter of 150 mm or more, and drying and sintering the resultant plugs, the sintering step comprising a temperature-elevating process, a temperature-keeping process and a temperature-lowering process, and the temperature-elevating process having a temperature-elevating speed of 70-500° C./hr from 800° C. to the highest keeping temperature.

7 Claims, 2 Drawing Sheets

U.S. PATENT DOCUMENTS

2006/0185335 A1 * 8/2006 Ichikawa .................. 55/523
2007/0269634 A1   11/2007 Suenobu et al.

FOREIGN PATENT DOCUMENTS

| EP | 0506301 | A2 |   | 9/1992 |
| EP | 0535872 | A1 |   | 4/1993 |
| JP | 53-082822 | A |   | 7/1978 |
| JP | 56158812 | A | * | 12/1981 |
| JP | 57-007215 | A |   | 1/1982 |
| JP | 63-028875 | A |   | 2/1988 |
| JP | 02-255576 | A |   | 10/1990 |
| JP | 2001-300922 | A |   | 10/2001 |
| JP | 2002-160976 | A |   | 6/2002 |
| JP | 2002-234780 | A |   | 8/2002 |
| JP | 2003-277162 | A |   | 10/2003 |
| JP | 2004-169636 | A |   | 6/2004 |
| JP | 2004-292292 | A |   | 10/2004 |
| JP | 2005-296936 | A |   | 10/2005 |
| WO | 2005/068396 | A1 |   | 7/2005 |
| WO | 2009/032119 | A2 |   | 3/2009 |

* cited by examiner

US 8,398,797 B2

PRODUCTION METHOD OF CORDIERITE-BASED CERAMIC HONEYCOMB FILTER

CROSS REFERENCE TO RELATED APPLICATIONS

This application is a National Stage of International Application No. PCT/JP2007/069106 filed Sep. 28, 2007, claiming priority based on Japanese Patent Application No. 2006-268616, filed Sep. 29, 2006, the contents of all of which are incorporated herein by reference.

FIELD OF THE INVENTION

The present invention relates to a method for producing a ceramic honeycomb filter suitable for exhaust-gas-cleaning apparatuses of automobile engines, particularly exhaust-gas-cleaning apparatuses for removing particulate matter from an exhaust gas from diesel engines.

BACKGROUND OF THE INVENTION

An exhaust gas from diesel engines, etc. contains a large amount of carbon-based particulate matter, which adversely affects humans and environment when discharged into the air. Accordingly, ceramic honeycomb filters are used to remove particulate matter in exhaust gas parts connected to diesel engines, etc. As shown in FIG. 1, a ceramic honeycomb filter 10 comprises a ceramic honeycomb structure 11 comprising porous cell walls 3 defining large numbers of flow paths 2a, 2b and a peripheral wall 1, and plugs 4, 5 alternately sealing both ends 7, 8 of flow paths 2a, 2b in a checkerboard pattern.

A ceramic honeycomb filter with such a structure can be produced by the method described, for instance, in JP 2001-300922 A. JP 2001-300922 A discloses a method for producing a ceramic honeycomb structure comprising filling a plugging slurry to predetermined cells of an unsintered ceramic honeycomb molding at both ends, and sintering it. However, when the unsintered ceramic honeycomb molding is provided with plugs by the method described in JP 2001-300922 A, the ceramic honeycomb molding usually solidified by a water-soluble binder such as methylcellulose, etc. is brought into contact with a plugging slurry comprising a liquid component such as water, etc., so that water in the slurry intrudes into the molding. This softens the water-soluble binder in the molding, deforming the ceramic honeycomb molding, removes water from the plugging slurry, turning the plugging slurry less flowable, and fails to provide plugs with sufficient length.

JP 57-7215 A discloses a method for forming plugs in a sintered cordierite honeycomb structure, comprising attaching a film to each end surface of the sintered cordierite honeycomb structure, providing the film with holes at positions corresponding to flow paths in which plugs are formed in a checkerboard pattern, charging a cordierite-based plugging material into the flow paths through the holes of the film, and sintering the plugging material at the highest temperature of 1400° C. for 2 hours. Because the plug-forming method of JP 57-7215 A charges the plugging slurry into the sintered ceramic honeycomb structure, it is free from the problems of the method of JP 2001-300922 A that the ceramic honeycomb molding is deformed, and that the resultant plugs do not have sufficient length. However, the plug-forming method of JP 57-7215 A suffers insufficient bonding of plugs to cell walls due to the difference in sintering shrinkage between the sintered body and the unsintered plugs, and insufficient bonding strength. Namely, when an unsintered plugging material is charged into the flow paths of a sintered ceramic honeycomb structure and sintered, shrinkage and expansion substantially do not occur in the sintered body which has already undergone sintering shrinkage, but the plugs undergoes dimensional change such as shrinkage and expansion by a sintering reaction, resulting in gaps between the cell walls and the plugs and thus extremely low bonding strength between the plugs and the cell walls. Particularly when the plugs are formed by cordierite, they suffer large sintering shrinkage, making it likely that the plugs have low bonding strength to the cell walls.

JP 63-28875 B discloses a method for forming plugs in a cordierite-based ceramic honeycomb structure, comprising sealing the flow paths of a cordierite honeycomb structure obtained by extruding, drying and sintering at 1420° C. for 2 hours with a cordierite-forming material such as α-alumina, calcined talc, calcined kaolin, quartz or amorphous silica, mullite, etc., which is not reactive in a low-temperature region during sintering, in a checkerboard pattern on one end side, similarly sealing the remaining flow paths on the other end side in a checkerboard pattern, drying the plugging material at 150° C. for 2 hours, and sintering the plugging material at the highest temperature of 1400° C. for 6 hours. JP 63-28875 B describes that these cordierite-forming materials suppress the shrinkage of aluminum hydroxide, untreated clay, talc, etc., which are also cordierite-forming materials, at relatively low temperatures, and cause a cordierite-forming reaction drastically at temperature of 1200° C. or higher, resulting in volume expansion, which is effective to reduce the sintering shrinkage. However, the method of JP 63-28875 B cannot completely suppress the shrinkage of the plugging material even though it is made of a shrinkage-suppressing, cordierite-forming material. It is thus likely that there is not sufficient bonding strength between the plugs and the cell walls because of insufficient bonding of the plugging material to the cell walls. Particularly in the case of a sintered cordierite honeycomb having an outer diameter of 150 mm or more, the plugging slurry introduced into flow paths may not form plugs of sufficient length depending on the viscosity of the slurry. When the plugs have insufficient length, the shrinkage of the plugging material causes insufficient bonding of the plugging material to cell walls, resulting in insufficient bonding strength between the plugs and the cell walls.

When plugs are formed and sintered in the sintered ceramic honeycomb structure to provide a ceramic honeycomb filter, two sintering steps; a step of sintering the ceramic honeycomb structure, and a step of sintering the plugging material to fix it to the cell walls of the ceramic honeycomb structure, are needed, resulting in a longer production time and lower productivity, leading to higher cost. As a result, it has been desired to shorten the sintering time.

OBJECT OF THE INVENTION

Accordingly, an object of the present invention is to provide a method for producing a cordierite-based ceramic honeycomb filter with improved bonding strength between plugs and a ceramic honeycomb structure, the plugs being surely adhered to cell walls of the ceramic honeycomb structure, by forming plugs in a sintered ceramic honeycomb structure and sintering the plugs for a reduced time.

DISCLOSURE OF THE INVENTION

As a result of intensive investigation in view of the above object, the inventors have found that although sintering is usually conducted by elevating the temperature as slowly as possible in a temperature range, in which plugs are subjected to heat shrinkage during sintering, to minimize influence by the heat shrinkage, a rather high-speed temperature elevation causes the bonding of plugs to cell walls before the plugs shrink, thereby avoiding the reduction of bonding strength between the plugs and the cell walls and the detachment of the plugs. The present invention has been completed based on such finding. Particularly in the case of a large sintered ceramic honeycomb having an outer diameter of 150 mm or more, slurry is not fully introduced because of its viscosity, resulting in insufficient plug length, so that the shrinkage of a plugging material during sintering may cause insufficient bonding between the plugging material and the cell walls. However, the method of the present invention can provide sufficient bonding strength irrespective of the plug length, thereby remarkably preventing the detachment of the plugs.

Thus, the method of the present invention for producing a cordierite-based ceramic honeycomb filter comprises the steps of introducing a plugging material of a cordierite-forming material into predetermined flow paths of a sintered, cordierite-based ceramic honeycomb having an outer diameter of 150 mm or more, and drying and sintering the resultant plugs, the sintering step comprising a temperature-elevating process, a temperature-keeping process and a temperature-lowering process, and the temperature-elevating process having a temperature-elevating speed of 70-500° C./hr from 800° C. to the highest keeping temperature.

The temperature-lowering process preferably has a temperature-lowering speed of 30-400° C./hr from the highest keeping temperature to 800° C.

The cordierite-forming material preferably contains 5-22% by mass of silica having an average particle size of 5-25 μm.

The sintering is preferably conducted in a continuous furnace. The continuous furnace is preferably a roller heath type.

DESCRIPTION OF THE BEST MODE OF THE INVENTION

Figure 1:
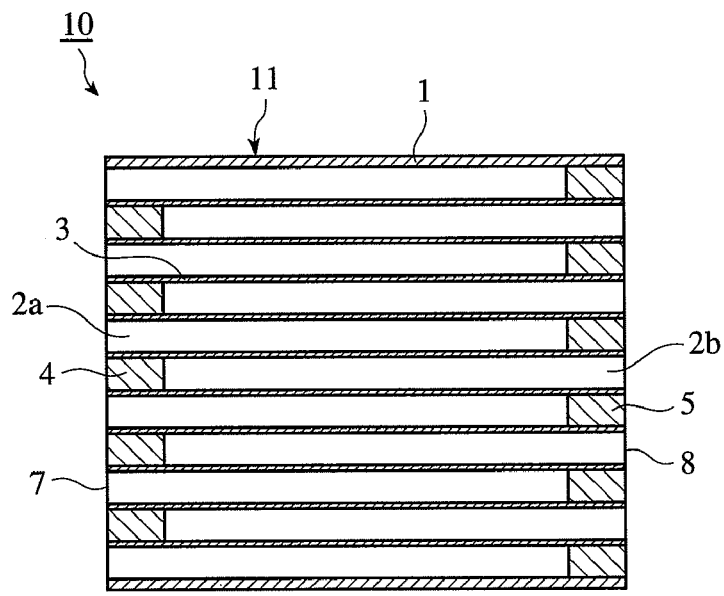
FIG. 1 is a schematic cross-sectional view showing one example of ceramic honeycomb filters produced by the method of the present invention.

The function of the present invention will be explained below. The method of the present invention for producing a cordierite-based ceramic honeycomb filter comprises the steps of introducing a plugging material of a cordierite-forming material into predetermined flow paths of a sintered, cordierite-based ceramic honeycomb having an outer diameter of 150 mm or more, and drying and sintering the resultant plugs, the sintering step comprising a temperature-elevating process, a temperature-keeping process and a temperature-lowering process, and the temperature-elevating process having a temperature-elevating speed of 70-500° C./hr from 800° C. to the highest keeping temperature. Although the temperature elevation from 800° C. to the highest keeping temperature is conducted usually at about 50° C./hr, it is conducted at an extremely higher speed of 70-500° C./hr in the method of the present invention.

With such high-speed temperature elevation, it is considered that the plugging material of a cordierite-forming material is quickly heated to a temperature region of 1350-1450° C., in which cordierite is formed, so that the plugging material is adhered to cell walls by sintering before it shrinks. Further, because of heat capacity difference between each plug having a larger volume and a thin cell wall, the plug is heated faster in a portion near the cell wall than in an inside portion distant from the cell wall, so that a sintering reaction first occurs in a plugging material near the cell wall, securing the bonding strength of the plugs to the cell walls with no gaps therebetween.

The above high-speed temperature elevation surely fixes plugs to the cell walls, resulting in less likelihood of generating gaps between the cell walls and the plugs, thereby preventing the reduction of particulate-matter-capturing efficiency. Because the temperature-elevating process has as high a temperature-elevating speed as 70-500° C./hr from 800° C. to the highest keeping temperature, the plug-sintering time can be short. When the temperature-elevating speed from 800° C. to the highest keeping temperature is lower than 70° C., the entire plugs uniformly heat-shrinks in a plug-heat-shrinking temperature region (1000-1200° C.), generating gaps before a fixing reaction occurs between the plugs and the cell walls. Also, the time needed for sintering plugs is undesirably long. When the temperature-elevating speed exceeds 500° C./hr, there is too large a temperature gradient in the sintered ceramic honeycomb, so that heat stress is likely to cause cracking in the sintered ceramic honeycomb.

The temperature-elevating speed is preferably 100-400° C./hr, more preferably 150-300° C./hr. In view of the above function, an average temperature-elevating speed from 800° C. to the highest keeping temperature is preferably 70-500° C./hr. An average temperature-elevating speed from 1100° C. to the highest temperature is preferably 70-500° C./hr. Also, an average temperature-elevating speed in a heat-shrinking temperature region of 1000-1200° C. is preferably 70-500° C./hr. To suppress the final volume expansion of the plugging material, the highest keeping temperature for sintering the plugs is preferably lower than the highest keeping temperature for sintering the ceramic honeycomb molding, thereby making it unlikely to generate gaps between the cell walls and the plugs.

The temperature-lowering process preferably has a temperature-lowering speed of 30-400° C./hr from the highest keeping temperature to 800° C. With a higher temperature-lowering speed from the highest keeping temperature to 800° C., the plugs and the cell walls adhered to each other by a sintering reaction during temperature elevation are cooled without cracking, thereby preventing the detachment of plugs from the ceramic honeycomb filter during use, which leads to decrease in particulate matter-capturing efficiency. Also, such high-speed cooling can shorten the plug-sintering time. When the temperature-lowering speed is less than 30° C./hr, the time needed for sintering plugs is undesirably long. When the temperature-lowering speed exceeds 400° C./hr, a large temperature gradient is generated in the sintered ceramic honeycomb, making it likely to cause cracking in the sintered ceramic honeycomb by heat stress. The average temperature-lowering speed from the highest keeping temperature to 800° C. is preferably 30-400° C./hr. The average temperature-lowering speed is more preferably 80-300° C./hr, further preferably 100-200° C./hr.

The cordierite-forming material preferably contains 5-22% by mass of silica having an average particle size of 5-25 μm. Sintering shrinkage changes depending on the amount of silica in the cordierite-forming material comprising kaolin, talc, alumina, aluminum hydroxide, silica, etc. Using 5-22% by mass of silica having an average particle size of 5-25 μm, the sintering shrinkage of the entire plugs can be minimized. Thus, the adjustment of the plugging material composition provides large effects of the present invention of suppressing the plugging material shrinkage and increasing the plug strength. When silica is less than 5% by mass of the cordierite-forming material, there is too large a shrinkage ratio, making it likely to generate gaps between the plugs and the cell walls. On the other hand, when silica exceeds 22% by mass, the entire plugs tend to be easily expanded, making it likely that plugs are detached from the cell walls by an expansion force. The amount of silica added is more preferably 10-20% by mass. Silica having an average particle size of less than 5 μm provides large shrinkage. Silica having an average particle size exceeding 25 μm provides the plugs with large pores, making cracking likely.

The sintering is preferably conducted in a continuous furnace. Articles are continuously supplied into the continuous furnace through one opening, and heat-treated therein while being conveyed at a predetermined speed. Each zone in the furnace is heated at a predetermined temperature, and the temperature of the article changes while being conveyed in the furnace, so that sintering is conducted during the process of temperature elevation→temperature-keeping→temperature-lowering. Because each zone is fully heated in advance, heat from a heat source is efficiently used to heat the articles. Accordingly, quick temperature elevation occurs, reducing the time needed for sintering plugs. The temperature-elevating speed from 800° C. to the highest keeping temperature, and the temperature-lowering speed from the highest keeping temperature to 800° C. are determined by the temperature of each zone and the conveying speed.

The continuous furnace for continuously introducing articles through one opening and conveying them at a predetermined speed is classified to a conveyor type, a pusher type of conveying articles by pushing with a pusher from a furnace inlet, etc. depending on the conveying system. Because the sintered ceramic honeycomb introduced into the furnace does not have enough resistance to impact, it may be cracked by vibration and impact generated during conveying. Accordingly, it is preferable to use a conveyor-type continuous furnace less transmitting impact and vibration during conveying.

The continuous furnace is preferably a roller heath type, a so-called roller hearth kiln. Using a conveyor-type conveying mechanism in the continuous furnace, the sintered ceramic honeycomb conveyed in the furnace is less subjected to impact and vibration, so that it is less cracked. The conveyor-type conveying may use belts, hungers, rollers, etc. Among them, a roller heath type conveying sintered ceramic honeycombs on trays, etc. on rolling rollers arranged with a proper pitch can easily adjust the temperature-elevating speed and the temperature-lowering speed, because the rotation of rollers can be arbitrarily set. Further, vibration and impact can be avoided during conveying to prevent the cracking of the sintered ceramic honeycomb. The rollers are preferably made of heat-resistant ceramics such as silicon carbide, etc.

The present invention will be described in more detail with reference to Examples below without intension of limitation.

Comparative Example 1

Cordierite-forming material powder comprising 50% by mass of $SiO_2$, 35% by mass of $Al_2O_3$ and 15% by mass of MgO was prepared from kaolin powder, talc powder, silica powder and alumina powder, mixed with a binder such as methylcellulose, hydroxypropylmethylcellulose, etc., a lubricant, and graphite as a pore-forming material, sufficiently dry-blended, and then sufficiently blended with water to prepare a soft, moldable ceramic material. This moldable material was extruded, and cut to obtain a honeycomb molding. This molding was dried, and sintered at the highest keeping temperature of 1400° C. to obtain a cordierite honeycomb structure 11 having a cell wall thickness of 0.3 mm, a porosity of 65%, an average pore diameter of 20 μm, a cell wall pitch of 1.5 mm, an outer diameter of 280 mm and a longitudinal length of 310 mm.

Figure 2A:
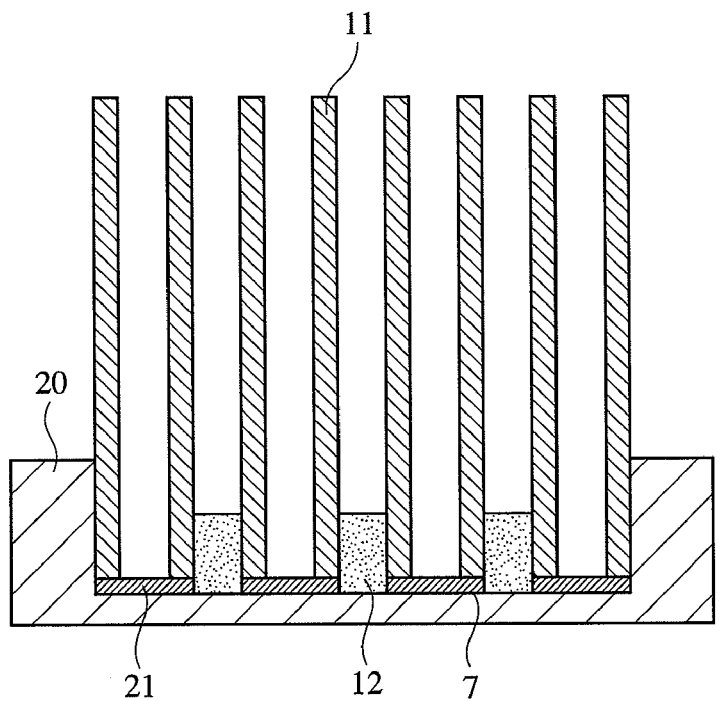
FIG. 2(a) is a schematic view showing one aspect of a method of forming plugs in the ceramic honeycomb filter.
Figure 2B:
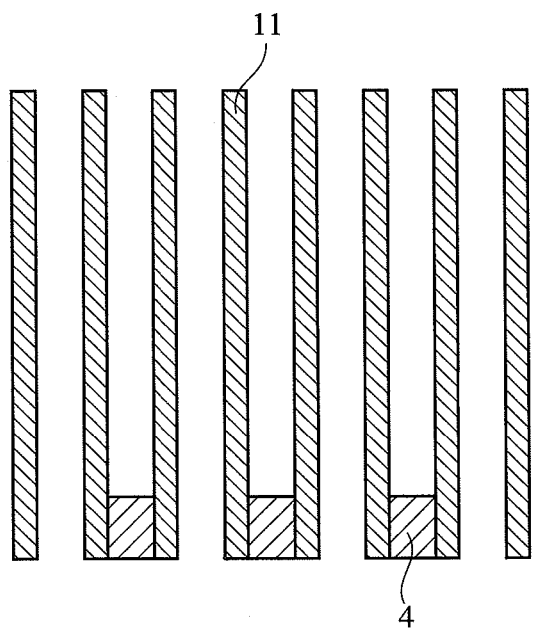
FIG. 2(b) is a schematic view showing another aspect of a method of forming plugs in the ceramic honeycomb filter.

A plugging film 21 was attached to one end surface 7 of the cordierite honeycomb structure 11, and provided with holes at positions corresponding to predetermined flow paths in which plugs were formed. Cordierite-forming material powder comprising 50% by mass of $SiO_2$, 35% by mass of $Al_2O_3$ and 15% by mass of MgO was prepared from kaolin powder, talc powder, silica powder, and alumina powder, and mixed with methylcellulose, a lubricant and water to prepare a plug-forming slurry 12, which was charged into a vessel 20. The honeycomb structure 11 was dipped in the slurry 12 to form plugs 4 as shown in FIGS. 2(a) and 2(b). At the other end surface 8, plugs 5 were similarly formed. Silica used had an average particle size of 25 μm, and its amount was 20% by mass of the cordierite-forming material.

Using a roller-heath-type continuous furnace (roller hearth kiln), the plugs formed at both ends of the honeycomb structure 11 were sintered at the highest keeping temperature of 1390° C., to obtain a cordierite-based ceramic honeycomb filter 10. The temperature-elevating speed from 800° C. to the highest keeping temperature (1390° C.) was 600° C./hr, a time period of keeping the highest temperature (1390° C.) was 6 hours, and the temperature-lowering speed from the highest keeping temperature (1390° C.) to 800° C. was 500° C./hr.

Examples 1-14, and Comparative Examples 2 and 3

Figure 3:
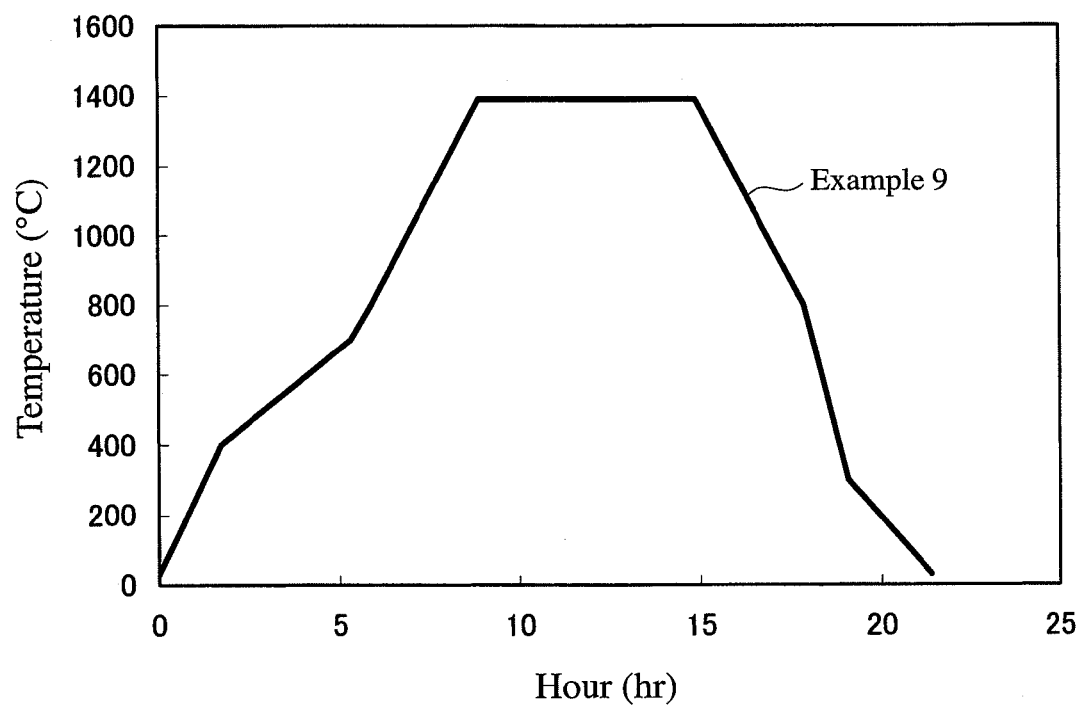
FIG. 3 is a graph showing the relation between sintering time and temperature in the sintering step in Example 9.

Cordierite-based ceramic honeycomb filters were produced in the same manner as in Comparative Example 1, except for changing the average particle size of silica used in the plug-forming slurry, the amount of the silica per the cordierite-forming material, the temperature-elevating speed from 800° C. to the highest keeping temperature (1390° C.), the temperature-lowering speed from the highest keeping temperature (1390° C.) to 800° C., and the type of the sintering furnace (a batch-type furnace, a pusher-type continuous furnace, or a roller-heath-type continuous furnace) as shown in Table 1. The relation between a furnace temperature and a time period in the sintering step in Example 9 is shown in FIG. 3.

Examples 15 and 16

Cordierite-based ceramic honeycomb filters were produced in the same manner as in Example 6, except for changing the temperature-elevating speed from 800° C. to 1100° C., the temperature-elevating speed from 1100° C. to the highest keeping temperature (1390° C.), and the temperature-lowering speed from the highest keeping temperature (1390° C.) to 800° C. as shown in Table 2.

The resultant ceramic honeycomb filters were evaluated with respect to the plug strength, the cracking of the honeycomb structure, and the time needed for sintering plugs.

The plug strength was determined by inserting a stainless steel rod having a diameter of 1 mm into a plug-formed flow path, measuring a load applied to the rod, at which the plug was broken, and averaging the values of load measured on 10 plugs. It was expressed as a relative value, assuming that the plug strength of Comparative Example 3 was 1.0.

Cracking was evaluated according to the following standard.

Excellent: Not cracked.

Good: Cracked without causing practical problem.

Poor: Cracked, causing practical problem.

The time needed for sintering plugs was evaluated relative to Comparative Example 3 as follows:

Excellent: Extremely shortened.

Good: Shortened.

Poor: The same length.

TABLE 1

| No. | Temp.-Elevating Speed (° C./hr) From 800° C. To 1390° C. | Temp.-Lowering Speed (° C./hr) From 1390° C. To 800° C. | Average Particle Size of Silica (μm) | Amount of Silica (%) |
|---|---|---|---|---|
| Comparative Example 1 | 600 | 500 | 25 | 20 |
| Example 1 | 500 | 500 | 18 | 25 |
| Example 2 | 400 | 500 | 18 | 22 |
| Example 3 | 300 | 300 | 18 | 22 |
| Example 4 | 300 | 300 | 18 | 22 |
| Example 5 | 300 | 300 | 18 | 15 |
| Example 6 | 250 | 250 | 18 | 20 |
| Example 7 | 250 | 250 | 18 | 15 |
| Example 8 | 250 | 250 | 5 | 15 |
| Example 9 | 200 | 200 | 18 | 20 |
| Example 10 | 150 | 100 | 18 | 20 |
| Example 11 | 150 | 100 | 18 | 20 |
| Example 12 | 120 | 100 | 18 | 20 |
| Example 13 | 100 | 100 | 10 | 20 |
| Example 14 | 70 | 80 | 18 | 15 |
| Comparative Example 2 | 50 | 50 | 18 | 20 |
| Comparative Example 3 | 20 | 20 | 1 | 10 |

| No. | Sintering Furnace | Plug Strength | Cracking | Sintering Time |
|---|---|---|---|---|
| Comparative Example 1 | Roller Heath Type | 2.4 | Poor | Excellent |
| Example 1 | Roller Heath Type | 1.9 | Good | Excellent |
| Example 2 | Roller Heath Type | 2.3 | Good | Excellent |
| Example 3 | Roller Heath Type | 2.1 | Excellent | Excellent |
| Example 4 | Pusher Type | 2.0 | Good | Excellent |
| Example 5 | Roller Heath Type | 2.2 | Excellent | Excellent |
| Example 6 | Roller Heath Type | 2.0 | Excellent | Excellent |
| Example 7 | Roller Heath Type | 2.1 | Excellent | Excellent |
| Example 8 | Roller Heath Type | 1.7 | Excellent | Excellent |
| Example 9 | Roller Heath Type | 1.9 | Excellent | Excellent |
| Example 10 | Roller Heath Type | 1.7 | Excellent | Excellent |
| Example 11 | Batch Furnace | 1.6 | Excellent | Excellent |
| Example 12 | Roller Heath Type | 1.7 | Good | Excellent |
| Example 13 | Roller Heath Type | 1.6 | Good | Excellent |
| Example 14 | Batch Furnace | 1.3 | Excellent | Good |
| Comparative Example 2 | Batch Furnace | 1.1 | Excellent | Poor |
| Comparative Example 3 | Batch Furnace | 1.0 | Excellent | Poor |

TABLE 2

| No. | TES[1] (° C./hr) From 800° C. to 1100° C. | TES[1] (° C./hr) From 1100° C. to 1390° C. | TLS[2] (° C./hr) From 1390° C. to 800° C. | Average Particle Size of Silica (μm) | Amount of Silica (%) |
|---|---|---|---|---|---|
| Example 15 | 60 | 200 | 200 | 18 | 20 |
| Example 16 | 100 | 150 | 100 | 18 | 20 |

| No. | Sintering Furnace | Plug Strength | Cracking | Sintering Time |
|---|---|---|---|---|
| Example 15 | Roller Heath Type | 1.9 | Excellent | Excellent |
| Example 16 | Roller Heath Type | 1.7 | Excellent | Excellent |

Note:
[1]"TES" represents a temperature-elevating speed.
[2]"TLS" represents a temperature-lowering speed.

As shown in Tables 1 and 2, the plugs were surely adhered to the cell walls in the ceramic honeycomb filters produced in Examples 1-16 within the present invention, and the sintering time of plugs was shortened. On the other hand, the sintered ceramic honeycomb of Comparative Example 1 was cracked due to a large temperature gradient, because the temperature-elevating speed from 800° C. to the highest keeping temperature exceeded 500° C./hr, and because the temperature-lowering speed from the highest keeping temperature to 800° C. exceeded 400° C./hr. In Comparative Examples 2 and 3, the plugs were not strongly adhered to the cell walls (insufficient plug strength), and the sintering time was long, because the temperature-elevating speed from 800° C. to the highest keeping temperature was lower than 70° C. in both Comparative Examples, and because the temperature-lowering speed from the highest keeping temperature to 800° C. was lower than 30° C. in Comparative Example 3.

EFFECTS OF THE INVENTION

By the method of the present invention, plugs can surely be adhered to the cell walls of a sintered, cordierite-based ceramic honeycomb structure even when the honeycomb structure has an outer diameter of 150 mm or more, with a shortened plug-sintering time. Accordingly, it can produce a cordierite-based ceramic honeycomb filter with improved reliability and efficiency.

What is claimed is:

1. A method for producing a cordierite-based ceramic honeycomb filter comprising the steps of introducing a plugging material into predetermined flow paths of a sintered, cordierite-based ceramic honeycomb having an outer diameter of 150 mm or more, and drying and sintering the resultant plugs, said sintering step comprising a temperature-elevating process, a temperature-keeping process and a temperature-lowering process, and said temperature-elevating process having a temperature-elevating speed of 100-500° C./hr from 800° C. to the highest keeping temperature, wherein said plugging material consists essentially of cordierite-forming materials, a binder, a lubricant and water, and wherein said cordierite-forming materials contain 5-22% by mass of silica having an average particle size of 10-25 μm, and wherein said plugs are heated faster in a portion near a cell wall than in an inside portion distant from said cell wall.

2. The method for producing a cordierite-based ceramic honeycomb filter according to claim 1, wherein said temperature-lowering process has a temperature-lowering speed of 30-400° C./hr from the highest keeping temperature to 800° C.

3. The method for producing a cordierite-based ceramic honeycomb filter according to claim 1, wherein said sintering is conducted in a continuous furnace.

4. The method for producing a cordierite-based ceramic honeycomb filter according to claim 3, wherein said continuous furnace is a roller heath type.

5. The method for producing a cordierite-based ceramic honeycomb filter according to claim 1, wherein said temperature-elevating process has a temperature-elevating speed of 150-300° C./hr from 800° C. to the highest keeping temperature.

6. The method for producing a cordierite-based ceramic honeycomb filter according to claim 1, wherein said plugging material is sintered to a cell wall before shrinking.

7. The method for producing a cordierite-based ceramic honeycomb filter according to claim 1, wherein said highest keeping temperature is in the range of 1350-1450° C.

* * * * *